(12) United States Patent
Intrater et al.

(10) Patent No.: US 10,509,589 B2
(45) Date of Patent: Dec. 17, 2019

(54) SUPPORT FOR IMPROVED THROUGHPUT IN A MEMORY DEVICE

(71) Applicant: Adesto Technologies Corporation, Santa Clara, CA (US)

(72) Inventors: Gideon Intrater, Sunnyvale, CA (US); Bard Pedersen, Fremont, CA (US)

(73) Assignee: Adesto Technologies Corporation, Santa Clara, CA (US)

( * ) Notice: Subject to any disclaimer, the term of this patent is extended or adjusted under 35 U.S.C. 154(b) by 287 days.

(21) Appl. No.: 15/329,485

(22) PCT Filed: Aug. 13, 2015

(86) PCT No.: PCT/US2015/045124
§ 371 (c)(1),
(2) Date: Jan. 26, 2017

(87) PCT Pub. No.: WO2016/043885
PCT Pub. Date: Mar. 24, 2016

(65) Prior Publication Data
US 2017/0185353 A1    Jun. 29, 2017

Related U.S. Application Data

(60) Provisional application No. 62/050,264, filed on Sep. 15, 2014.

(51) Int. Cl.
*G06F 12/00* (2006.01)
*G06F 3/06* (2006.01)
*G06F 12/0868* (2016.01)

(52) U.S. Cl.
CPC .......... *G06F 3/0659* (2013.01); *G06F 3/0611* (2013.01); *G06F 3/0679* (2013.01);
(Continued)

(58) Field of Classification Search
CPC .... G06F 3/0659; G06F 3/0611; G06F 3/0679; G06F 12/00; G06F 12/0868; G06F 2212/2022; G06F 2212/222
See application file for complete search history.

(56) References Cited

U.S. PATENT DOCUMENTS 5,461,701 A * 10/1995 Voth ...................... G06F 13/385
358/1.1
5,659,690 A * 8/1997 Stuber ................... G06F 13/385
710/307

(Continued)

*Primary Examiner* — Prasith Thammavong
(74) *Attorney, Agent, or Firm* — Michael C. Stephens, Jr.

(57) ABSTRACT

A method of controlling a memory device can include: (i) receiving a first read command for a critical byte, where the critical byte resides in a first group of a memory array on the memory device; (ii) reading the critical byte from the memory array in response to the first read command, and providing the critical byte; (iii) reading a next byte in the first group; (iv) outputting the next byte from the first group when a clock pulse; (v) repeating the reading the next byte and the outputting the next byte for each byte in the first group; (vi) reading a first byte in a second group of the memory array, where the second group is sequential to the first group, and where each group is allocated to a cache line; and (vii) outputting the first byte from the second group when a clock pulse is received.

40 Claims, 13 Drawing Sheets

(52) U.S. Cl.
CPC .......... *G06F 12/00* (2013.01); *G06F 12/0868* (2013.01); *G06F 2212/2022* (2013.01); *G06F 2212/222* (2013.01)

(56) References Cited

U.S. PATENT DOCUMENTS

| | | | |
|---|---|---|---|
| 2001/0024456 A1* | 9/2001 | Zaun | ........................ H04N 7/24 370/535 |
| 2002/0166028 A1 | 11/2002 | Shaw | |
| 2005/0172091 A1 | 8/2005 | Rotothor et al. | |
| 2011/0170354 A1 | 7/2011 | De Caro et al. | |
| 2011/0296110 A1 | 12/2011 | Lilly et al. | |
| 2012/0265951 A1 | 10/2012 | Lin et al. | |
| 2014/0254238 A1 | 9/2014 | Gilbert et al. | |
| 2015/0242129 A1 | 8/2015 | Hasan et al. | |
| 2017/0256297 A1* | 9/2017 | Intrater | .................. G11C 7/062 |
| 2019/0237118 A1* | 8/2019 | Intrater | .................... G11C 8/06 |

* cited by examiner

SUPPORT FOR IMPROVED THROUGHPUT IN A MEMORY DEVICE

This application claims the benefit of U.S. Provisional Application No. 62/050,264, filed Sep. 15, 2014, and is the National Stage of International Application No. PCT/US15/45124, filed Aug. 13, 2015, both of which are incorporated herein by reference in their entirety.

TECHNICAL FIELD

The present invention generally relates to the field of semiconductor memory devices. More specifically, embodiments of the present invention pertain to throughput improvements in memory devices.

BACKGROUND

Non-volatile memory (NVM) is increasingly found in applications, such as solid-state hard drives, removable digital picture cards, and so on. However, NVM may be limited in certain applications, such as when used for in-place execution for a cached CPU. In this case, the latency of the instruction fetches from the NVM can be excessive for some protocols, such as SPI protocols. Read latency issues as related to interface protocols can also occur in other types of memory devices.

DETAILED DESCRIPTION

Figure 1:
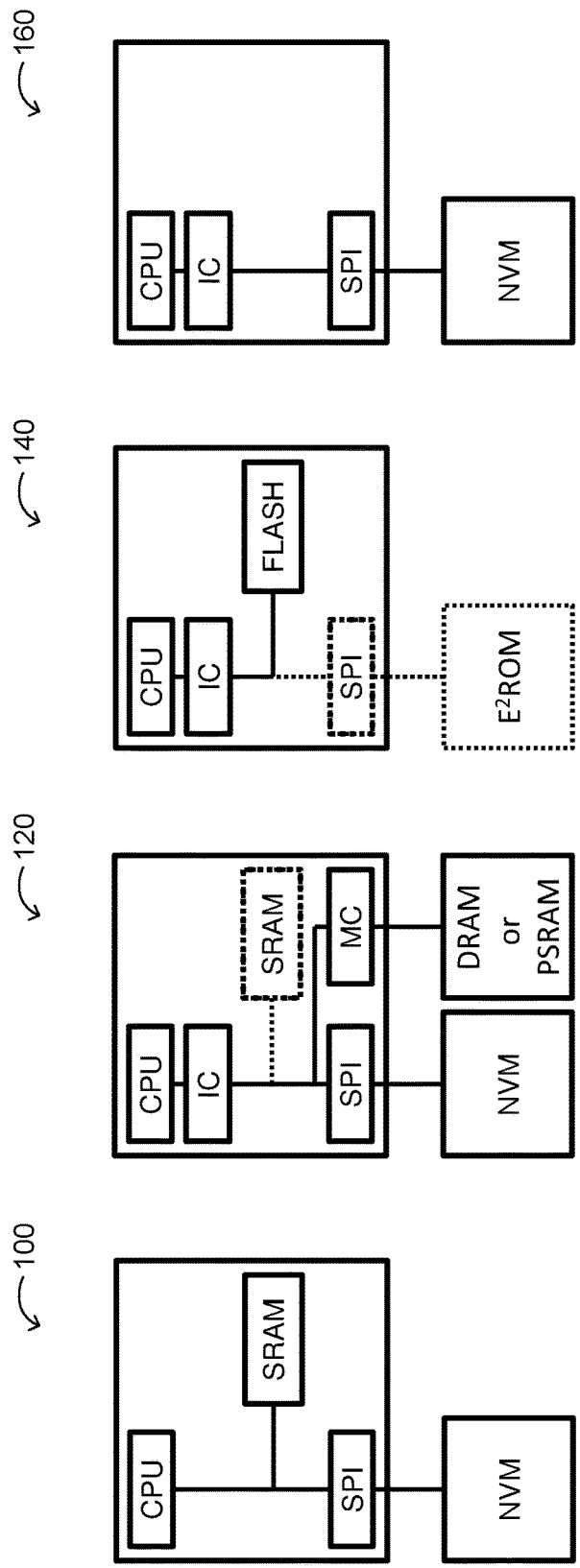
FIG. 1 is a block diagram of example code and data storage configurations that include NVM.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments are suitable to any form of memory device, including non-volatile memory (NVM), such as flash memory, M-RAM, E2ROM, conductive bridging random-access memory [CBRAM], resistive RAM [ReRAM], and so forth. As described herein, a write operation may be any operation on an NVM device that is intended to change a state of at least one of the memory locations on the device. Write operations can include program operations (e.g., to change a data state from 1 to 0) and erase operations (e.g., to change a data state from 0 to 1). Read operations can include accessing and determining a state of at least one of the memory locations (e.g., a byte of data) on the device.

As described herein, an in-place execution is a central processing unit (CPU) mode of operation whereby the memory device (e.g., an NVM) is part of the program memory hierarchy. In such an arrangement, at least some of the program code may be fetched directly out of the NVM and into the CPU and/or an associated cache. However, in systems that do not support in-place execution, some or all the contents of the NVM may first be copied into a memory device in the memory hierarchy, and then the program code can be fetched from that memory by the CPU. Also as described herein, a serial NVM device can be an NVM device with an interface to the host CPU that is serial, or conforms to a particular serial interface standard. For example, such interfaces can include serial peripheral interface (SPI) and inter-integrated circuit (I2C), although any suitable interface, such as various types of serial and/or parallel interfaces, can be utilized in certain embodiments.

The SPI protocol used in many serial NVM devices may have various inefficiencies when used for in-place execution. In some cases, a CPU may spend about 50 cycles to access 16 instruction bytes as part of a fetch operation. The first byte may have a relatively high latency (e.g., 50−(2*16)

=18 cycles). Also, this rate represents a relatively low SPI bus utilization (e.g., 32/50=84%). Thus, the extra latency and the low bus utilization imposed by current SPI protocols can dramatically impact the performance of the CPU/host device.

Many modern CPUs utilize an instruction cache in order to reduce sensitivity to the NVM latency for accesses. In many cases, the NVM access patterns of a CPU with an instruction cache are quite distinctive. A typical cache miss resulting from a non-sequential fetch (NSF) can result in a request for a cache line, and also may include a request for the critical word or byte first, then the sequential bytes or words following the critical byte or word for filling the end of the cache line, and then a "wrap-around" to bring the beginning of that cache line. Also, there may be a high probability that the next sequential cache line will be requested by the host as a sequential fetch (SF) following the NSF. In addition, the address of the sequential fetch can, by definition, be the address of the cache line following the previous or initial request (e.g., from the NSF). In particular embodiments, the NVM device (or embedded circuitry) and its interface protocol can be designed to better handle such sequential fetch requests, thereby potentially improving latency, throughput, and/or efficiency of the NVM.

A standard SPI read command may start with chip select (CS_) going active low, followed by opcode (e.g., 8-bits), address (e.g., 24-bits, or less in some devices), an optional mode (e.g., 8-bits), N dummy bytes (e.g., each byte is 8-bits, and N is typically configurable), and M data bytes (e.g., M×8-bit Bytes). Also, burst read requests are requests for a sequence of data bytes. Depending on the particular configuration of the NVM, read bursts can bring data from sequential addresses, with or without an address wrap-around to the beginning address of the CPU's cache line. When a wrap mode is enabled (e.g., via control register), a fixed length and naturally aligned group of, e.g., 8, 16, 32, or 64 bytes, can be read starting at the byte address provided by the read command, and then wrapping around at the group or CPU's cache line's alignment boundary.

Referring now to FIG. 1, shown is a block diagram of example code and data storage configurations that include NVM. NVM devices in particular embodiments are suitable to a wide variety of system arrangements, including embedded, standalone, and/or cache hierarchy arrangements. Example 100, such as for a boot NVM with on-chip SRAM, good performance and power can be achieved, may be particularly suited for relatively small systems. Example 120, such as for a boot NVM with external DRAM/PSRAM, may be suitable for larger systems, may have flexibility in the memory size, as well as process scalability. Example 140, such as for embedded NVM applications, may be particularly suited for mid-size systems. In example 160, such as for mid to large systems, may support memory size flexibility and process scalability in in-place execution arrangement.

Figure 2:
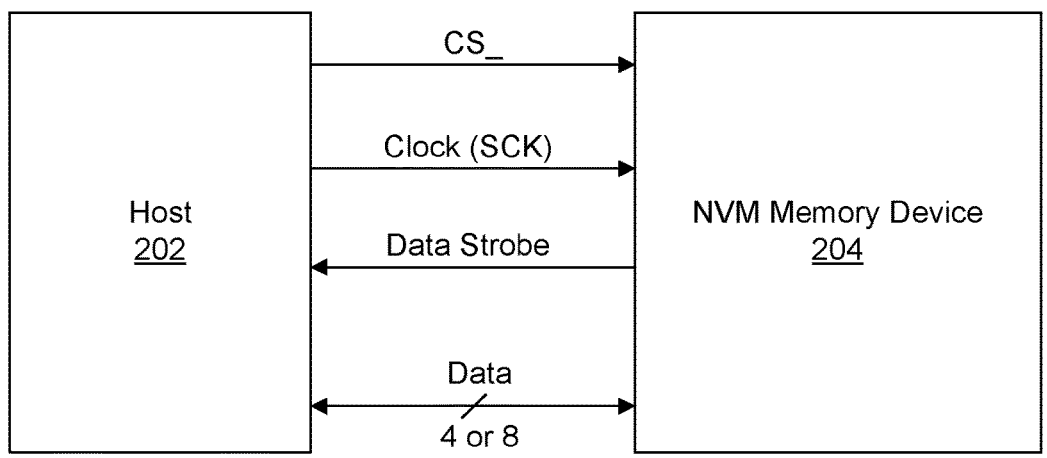
FIG. 2 is a block diagram of an example host and memory device arrangement, in accordance with embodiments of the present invention.

Referring now to FIG. 2, shown is a schematic block diagram 200 of an example host and serial memory device arrangement, in accordance with embodiments of the present invention. In this particular example, host 502 can interface with NVM memory device 204 via a serial interface (e.g., Quad or Octal SPI); however, any suitable interface can be supported in certain embodiments. For example, host 202 can be any type of processor or controller (e.g., CPU, MCU, DSP, general-purpose processor, etc.), and NVM memory device 204 can be any type of non-volatile memory device (e.g., Flash, CBRAM, magnetic RAM, ReRAM, etc.). NVM memory device 204 can thus be implemented in any of a variety of memory technologies. In some cases, NVM memory device 204 can be a serial flash memory that may be implemented in more traditional non-volatile memories, or in a CBRAM/ReRAM resistive switching memory technology.

Various interface signals, such as in an SPI interface, can be included for communication between host 202 and NVM memory device 204. For example, serial clock (SCK) can provide a clock to NVM memory device 204, and may be used to control the flow of data to and from the device. Command, address, and input data (e.g., on a serial input pin or pins) can be latched on a transition of SCK, while output data (e.g., on a serial output pin or pins) can be clocked out on a transition of SCK or data strobe (DS).

Chip select (CS_) can be utilized to select NVM memory device 204, such as from among a plurality of such memory devices, or otherwise as a way to access the device. When the chip select signal is de-asserted (e.g., at a high level), NVM memory device 204 will also be deselected, and can be placed in a standby mode. Activating the chip select signal (e.g., via a high to low transition on CS_) may be utilized to start an operation, and returning the chip select signal to a high level can be utilized for terminating an operation. For internally self-timed operations (e.g., a program or erase cycle), NVM memory device 204 may not enter standby mode until completion of the particular ongoing operation, even if chip select is de-asserted during the operation.

Bidirectional data (e.g., 1, 4, or 8 bytes wide) can be included in the interface between host 202 and NVM memory device 204 via serial input/output signals. Unidirectional data signaling can alternatively be used in some interfaces. In some cases, a serial input can be utilized for data input including command and address sequences. For example, data on a serial input pin can be latched on a rising edge of SCK, and data on the serial input pin can be ignored if the device is deselected (e.g., when the chip select signal is de-asserted). Data can be output from NVM memory device 204 via a serial output signal. For example, data on the serial output can be clocked out on a falling edge of SCK, and the serial output signal can be in a high impedance state when the device is deselected (e.g., when the chip select signal is de-asserted).

In one embodiment, memory device can include: (i) an interface configured to receive a first read command for a critical byte from a host; (ii) a memory array configured to store a plurality of bytes of data, where the critical byte resides in a first group of the memory array, and where execution of the first read command comprises reading the critical byte from the memory array, and providing the critical byte to the host; (iii) a controller configured to execute a read of a next byte in the first group; (iv) an output buffer configured to output the next byte from the first group when a clock pulse is received on the interface, where the controller and the output buffer are configured to repeat the read and the output of the next byte for each byte in the first group; (v) the controller being configured to read a first byte in a second group of the memory array, where the second group is sequential to the first group, and where each group is allocated to a cache line; and (vi) the output buffer being configured to output the first byte from the second group when a clock pulse is received on the interface.

As used herein, a "group" of a memory array can include a plurality of bytes of data on the memory device. In many applications, the "data" may actually be instructions to be executed by the CPU or host device (e.g., 202). In addition, each group may be allocated to, or otherwise correspond to, a cache line of the host, such as in an embedded cache or other cache device. That is, sizes of a cache line and a group (in the memory array) are the same, and the address boundaries of the cache line in the group are the same. In some cases as described herein, the terms "group" and "cache line" may be used interchangeably because the address boundaries and a number of bytes therein are the same. Also as used herein, a "next byte" in a memory array group can be a next sequential or consecutively addressed byte, such as an incremental addressed byte, in the group. If the previously read byte was the last or highest addressed byte in the group, then the "next byte" may be the first or lowest addressed byte in the group, and that is aligned with the group address. This latter case is part of a "wrap-around" function, which will be described in more detail below. In addition, a byte or a group that is "sequential" can indicate that the next byte/group has an address that is the next incremental address in sequence, except in the wrap-around case whereby the next byte can wrap around from the last byte to the first byte within a group.

Figure 3:
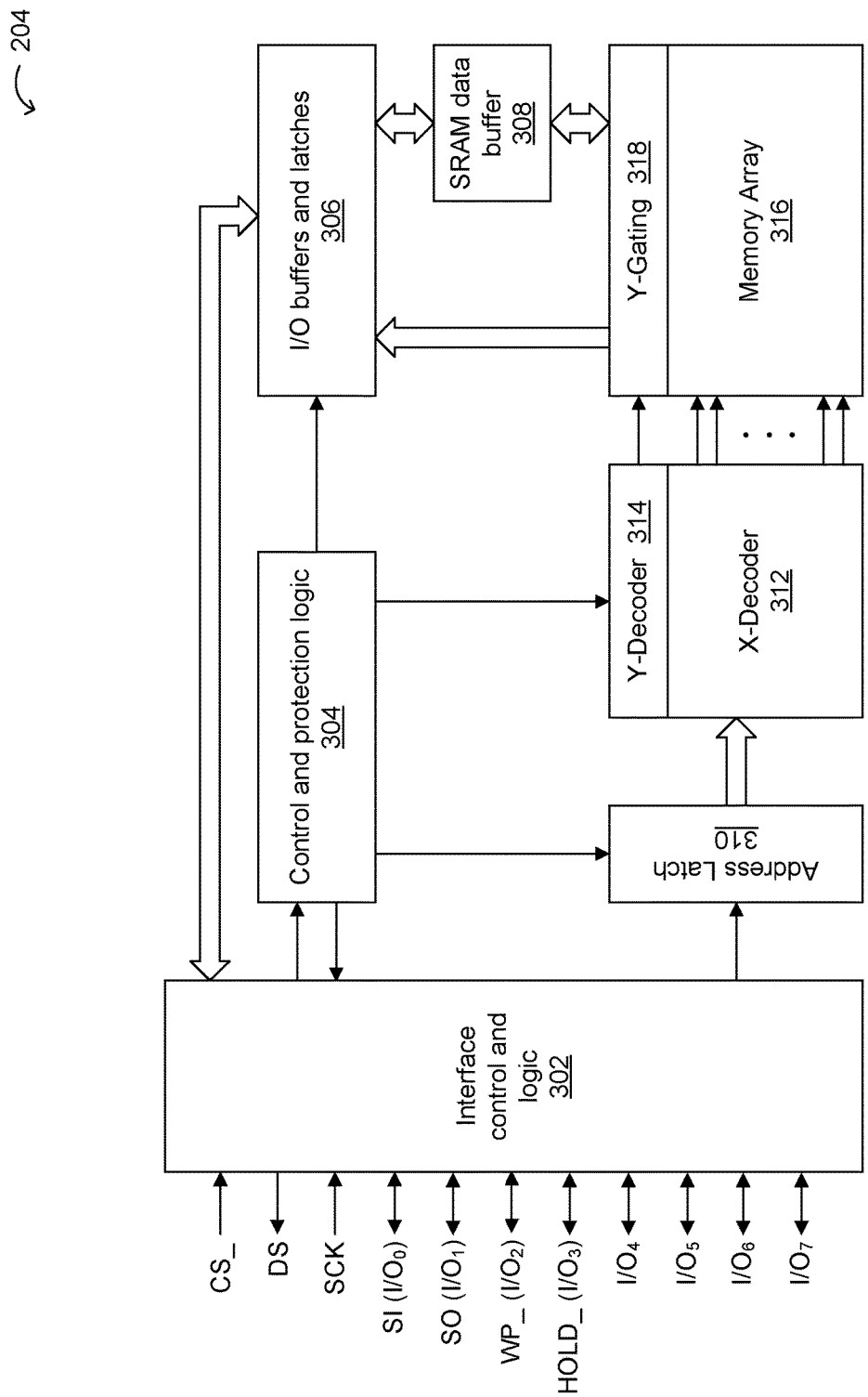
FIG. 3 is a block diagram of an example memory device, in accordance with embodiments of the present invention.

Referring now to FIG. 3, shown is a block diagram of an example memory device, in accordance with embodiments of the present invention. NVM memory device 204 can include interface control and logic 302, which may manage the interface (e.g., SPI interface), and decode the command and address information. Control and protection logic 304 can include control circuitry for reading and writing to the memory array, including address mapping and control for byte access and group addressing/ordering, as will be discussed in more detail below. For example, control and protection logic 304 can include a command decoder, registers for command execution parameters (e.g., read parameters, program/erase parameters, etc.), as well as a controller for command execution.

I/O buffers and latches 306 can control the input of data from interface control and logic 302, and the output of data to interface control and logic 302. For example, chip select (CS_) based control and clock (SCK) based control of data read from memory array 316 can be accommodated via I/O buffers in latches 306. That is, registers/latches in I/O buffers and latches 606 can be controlled by way of the toggling of SCK during burst reads and sequential fetch operations, as described herein. SRAM data buffers 308 can buffer/store data between memory array 316 and I/O buffers and latches 306. Address latch block 310 can receive address information via interface control logic 302, and may provide latched addresses to X-decoder 312 for row addresses, and to Y-decoder 314 for column addresses. Incrementing of addresses can be performed via address latch block 310 and/or control and protection logic 304. Y-decoder 314 can provide column addresses to Y-Gating 318, which can include pass gates or the like to multiplex I/O lines to/from memory array 316. Memory array 316 can include an array of non-volatile memory cells (e.g., CBRAM, ReRAM, Flash, etc.), as discussed above.

Figure 4:
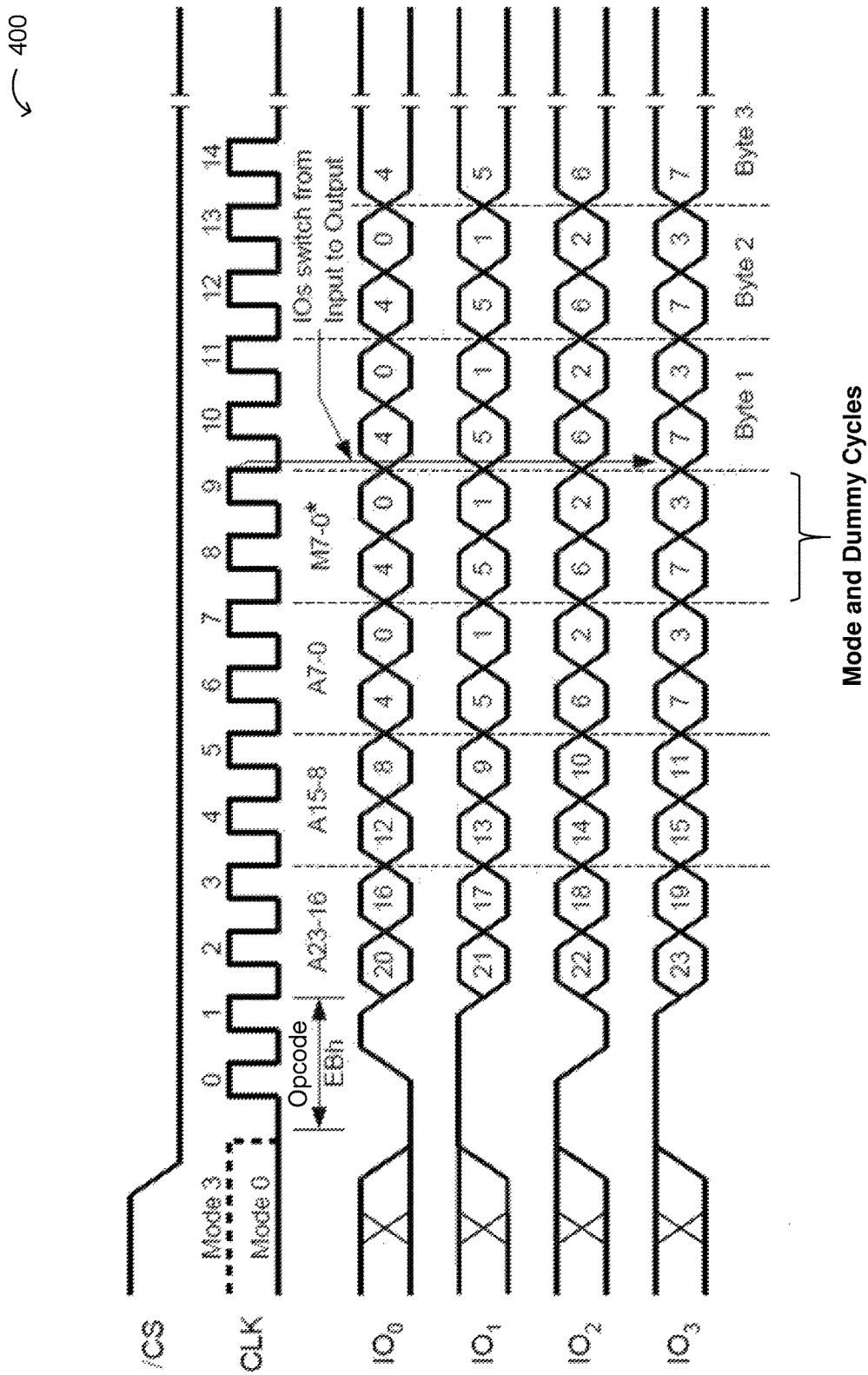
FIG. 4 is a waveform diagram of an example fast read timing.

Referring now to FIG. 4, shown is a waveform diagram 400 of an example read timing. This particular example shows only two mode and dummy cycles, but in a typical NVM device, the number can be much higher when running at full frequency. For example, SPI commands and data can be sent serially on one, two, four (in a quad SPI), or eight (in an octal SPI) lines. In an example full single transfer rate (STR) or single data rate (SDR) quad SPI mode, 4 bits can be sent every clock cycle, and the clock may go up to about 100 MHz, or higher in some cases. Certain embodiments are also suitable for dual transfer rate (DTR) or dual data rate (DDR) applications. In this example, the timing of an SPI read command in full STR quad SPI mode can be as follows: opcode (e.g., 8-bits)–2 clock cycles, address (e.g., 24-bits, but can be more in some devices, or less in other devices)–6 clock cycles, mode (e.g., 8-bits)–2 clock cycles, N dummy bytes (e.g., each byte is 8-bits, and N can be configurable)–2×N clock cycles, and M data (e.g., M×8-bit bytes)–2×M clock cycles. Thus in this example, the number of cycles required for accessing or bringing 16-bytes of data is: 2+6+2+N×2+16×2, so with N=3, the total is 48 cycles.

In particular embodiments, the NVM device and/or the interface with the host can be optimized to support a sequential fetch operation, which may be at least partially, and in some cases fully, implied. For example, if the read request that follows an NSF is a sequential fetch, the address may be implied to be the start address of the naturally aligned group/cache line of 8, 16, 32, or 64 bytes, depending on the cache line size (which may also be reflected in the configuration register of the NVM). Since sequential fetches can be relatively common, the NVM may be designed and prepared for such an operation, and the command for sequential fetch operations can be made as short as possible, or may be altogether removed as the command may be an implied command.

Thus in particular embodiments, the memory device can automatically undertake sequential fetch operations, with the sequentially fetched data being output to the host when requested (e.g., via toggling of the clock). This approach can substantially improve bus utilization on the interface. The data for the first byte(s) of the sequential fetch can be read ahead of time by the NVM device, such as immediately following (or in a pipelined manner during) the read of the last byte(s) of the previous "group" allocated to a cache line. Thus, there may be no need for address, mode, and/or dummy bytes associated with the sequential fetch. Further, the opcode bytes associated with the sequential fetch can also be avoided in some cases. As discussed above, the sequential fetch operation can be a substantially implied command, and thus no additional opcode need be applied via the interface.

Figure 5:
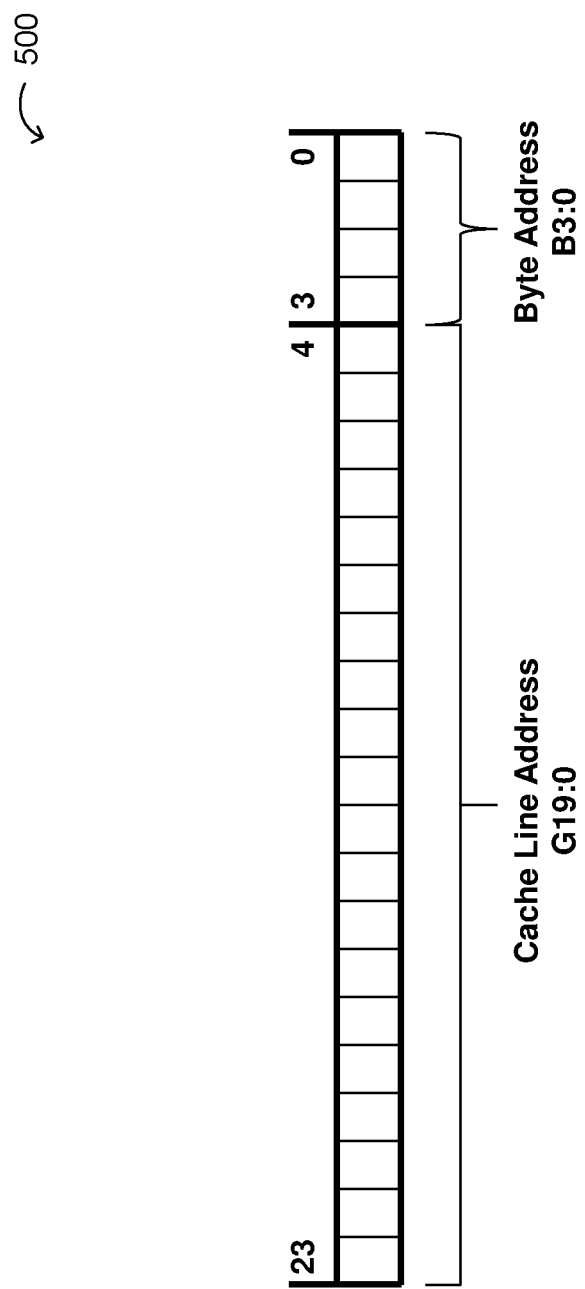
FIG. 5 is a diagram of an example address allocation for a sequential fetch.

Referring now to FIG. 5, shown is a diagram 500 of an example address allocation for a sequential fetch. The NVM can be modified to read ahead or pre-fetch the data for the first byte(s) of the sequential fetch, such as immediately following the read of the last byte(s) of the previous group/cache line. For example, if the NVM is configured for a cache line size of 16-bytes, and the device is using a 24-bit address (3 address bytes), the address of the previous cache line may be viewed as: the 4 least significant bits (LSBs) of the address can point to a specific byte within the cache line, while the 20 most significant bits (MSBs) of the address can point to a group address that is allocated to the specific cache line. Thus, the address of the first byte of the next cache line may have B3:0=0, and G19:0 can be equal to G19:0 of the previous group/cache line, but incremented by 1. The NVM can also maintain a count of the bytes accessed within a group, and when the count hits the group size, the address of the next group/cache line can be formed (e.g., at address latch 610).

Figure 6:
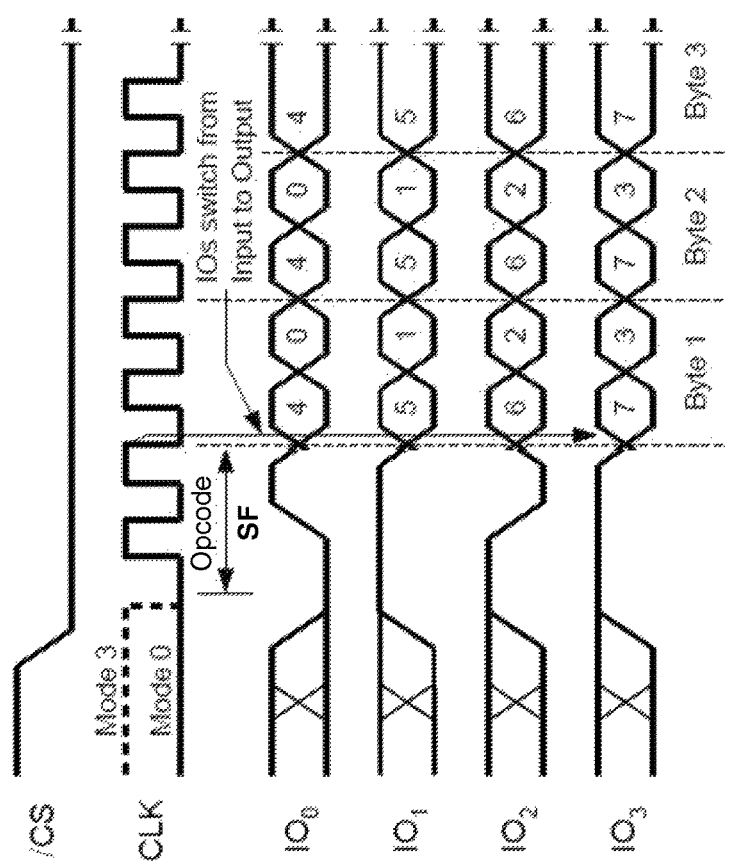
FIG. 6 is a waveform diagram of a first example timing diagram for a sequential fetch command, in accordance with embodiments of the present invention.

Referring now to FIG. 6, shown is a waveform diagram of a first example timing diagram for a sequential fetch command, in accordance with embodiments of the present invention. Particular embodiments can include an SPI command structure in support of sequential fetch operations. In some cases, the sequential fetch operations may be fully implied, and thus may be undertaken without an explicit command on the SPI interface. In other cases, the sequential fetch operations may be undertaken as a result of an explicit command, but with implied parameters associated therewith, thus simplifying the command structure.

Example 600 represents an explicit sequential fetch command with implied parameters. For example, the address of the first byte (e.g., byte 1) of the sequential fetch can be implied, and the data may be made ready in advance by the NVM device. Further, an indication may be utilized to inform the NVM that the CPU/host is actually requesting a sequential fetch. In this example, the sequential fetch SPI command can be used to provide such an indication. The NVM can be ready to send the data back to the CPU immediately following this sequential fetch command, and without need of address, mode, and/or dummy bytes. Using the previously discussed example of SPI read timing, the number of cycles required for bringing 16-bytes of sequential fetch data in this case can be: 2+16×2=34 cycles, which is 48−34=14 cycles less than required for an NSF (e.g., almost 30% faster).

Figure 7:
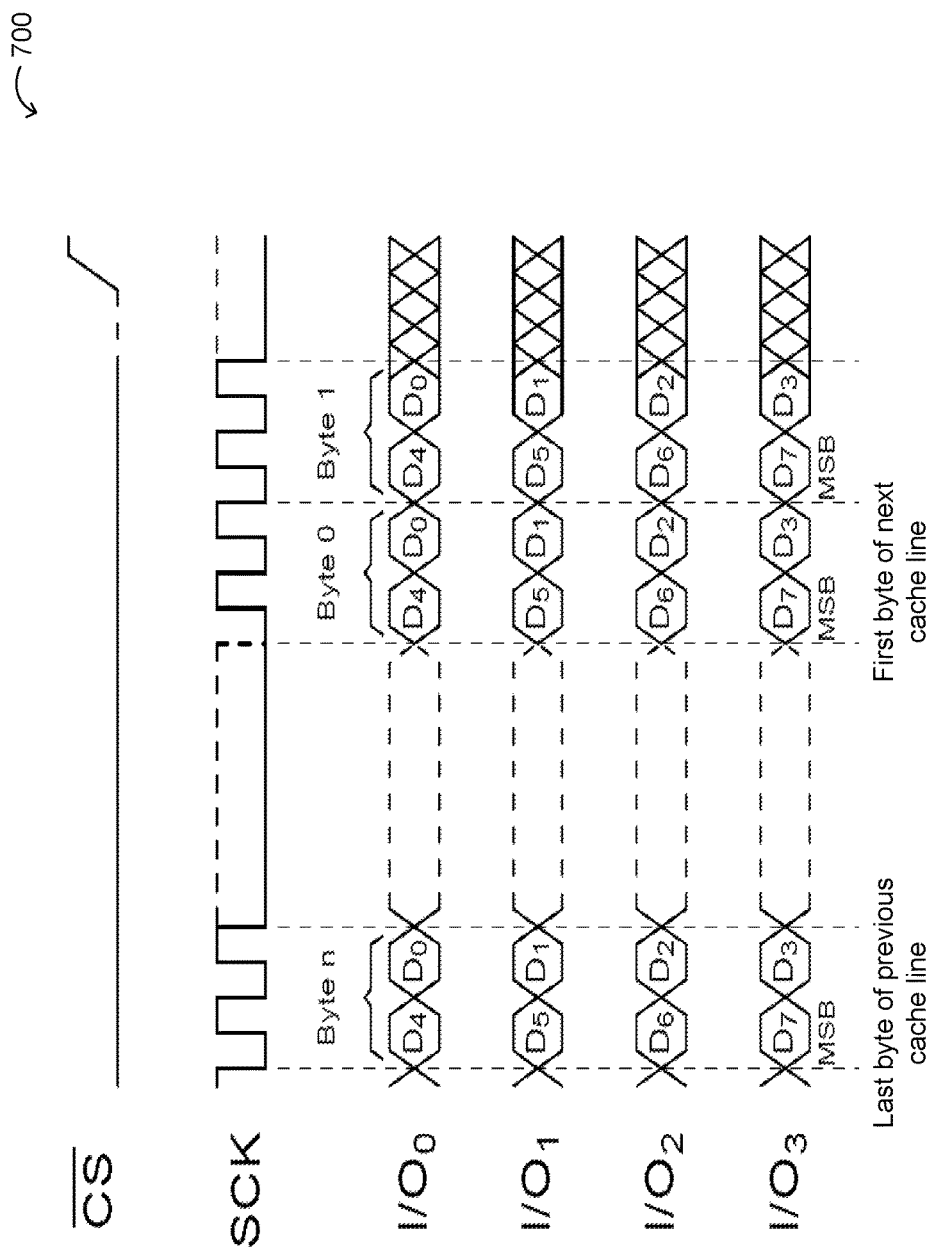
FIG. 7 is a waveform diagram of a second example timing diagram for a sequential fetch command, in accordance with embodiments of the present invention.

Referring now to FIG. 7, shown is a waveform diagram of a second example timing diagram for a sequential fetch command, in accordance with embodiments of the present invention. In example 700, the sequential fetch command can be fully implied as a continuation of a previous explicit (e.g., non-sequential) read command. The host may indicate to the NVM device that it wishes to receive the sequentially fetched data by toggling the clock (e.g., SCK) while maintaining the chip select as asserted (e.g., low). If the host has not yet made this determination, the clock can be suspended by being held either high or low and not toggling. As the address of the first byte of the next group of the sequential fetch can be implied and determined internally, and the data may also be ready ahead of time, the clock toggling indication may be utilized to inform the NVM that the CPU is actually requesting the sequentially fetched data. The value of the I/O pins (e.g., high, low, or tri-state) during clock suspension can depend on whether SCK is held at a high level or a low level during this suspension.

In particular embodiments, the sequential fetch can be considered or implied as a continuation of the previous SPI command. For example, when the SPI controller on the MCU/CPU/host detects that all the bytes in the cache line were read, the SPI clock can be stopped (suspended), while maintaining chip select (CS_) active low. If a sequential fetch is to be requested by the CPU, the controller can start toggling the SPI clock (SCK) again, and data can be immediately output from the NVM via an output buffer/driver (e.g., 606). If however, the CPU requests any other type of access to the NVM, such as a read (e.g., non-sequential) to a different address or any type of write operation, the controller can de-assert CS_ (e.g., bring high) for at least one cycle, and then start the new command. Using the previously discussed example of SPI read timing, the number of cycles required for bringing 16-bytes of sequential fetch data can be: 16×2=32 cycles, which is 48−32=16 cycles less than required for an NSF (e.g., almost 33% faster).

For example, the timing for fetching the next consecutive 16-byte cache line on a flash NVM device running at 133 MHz with a 100 ns access time (e.g., on a quad SPI SDR), can include the number of cycles being reduced from 54 to 32, the command being (byte) 2 clock cycles (eliminated for the next consecutive line), the address being (3 bytes) 6 clock cycles (eliminated for the next consecutive line), the mode plus dummy being 14 clock cycles (eliminated for the next consecutive line), and the data being (16 bytes) 32 clock cycles. On a quad SPI DDR, the number of cycles may be reduced from 34 to 16, the command (byte) 1 clock cycles (eliminated for the next consecutive line), the address (3 bytes) 3 clock cycles (eliminated for the next consecutive line), the mode plus dummy 14 clock cycles (eliminated for the next consecutive line), and the data (16 bytes) 16 clock cycles. On an octal SPI DDR, the number of cycles may be reduced from 24 to 8, command (byte) 0.5 clock cycles (eliminated for the next consecutive line), address (3 bytes) 1.5 clock cycles (eliminated for the next consecutive line), mode plus dummy 14 clock cycles (eliminated for the next consecutive line), and data (16 bytes) 8 clock cycles.

While servicing an instruction cache miss, CPUs may require that a remaining portion of the cache line will be fetched by the host processor after a fetch of the critical byte of data, particular embodiments support automatically accessing the next bytes to complete a read of the full group allocated to the requested cache line. Critical "byte X" may be output from the NVM device first, followed by remaining bytes of the group, including a wrap-around to the first byte at the group-aligned address. In addition, the NVM device may support any suitable group/cache line size, such as 8, 16, or 32 bytes, and in some cases 64 bytes. The cache line size may be configurable (e.g., via register settings) on the NVM device.

As shown, the last byte of the previous group can be followed by the first byte of the next group going forward, so the access then goes to the first byte of group/cache line N+1. This first byte (e.g., at the group-aligned address) of the next group can be conditionally provided based on the toggling of SCK, and may be readied by the NVM device with no additional latency. If the CPU/host brings up (de-asserts) chip select, then this first byte data for group N+1 may not be provided. However, so long as chip select remains asserted and the clock (e.g., SCK) continues to toggle, continued data, such as even the entire data stored in the NVM device can be read out with only one explicit command. The clock can be suspended if the data is not needed by the host processor at any time. As long as the chip select stays active low, the NVM device can clock data on each clock (e.g., SCK) edge or transition, and may continue to automatically cycle around to the next sequential byte.

Figure 8:
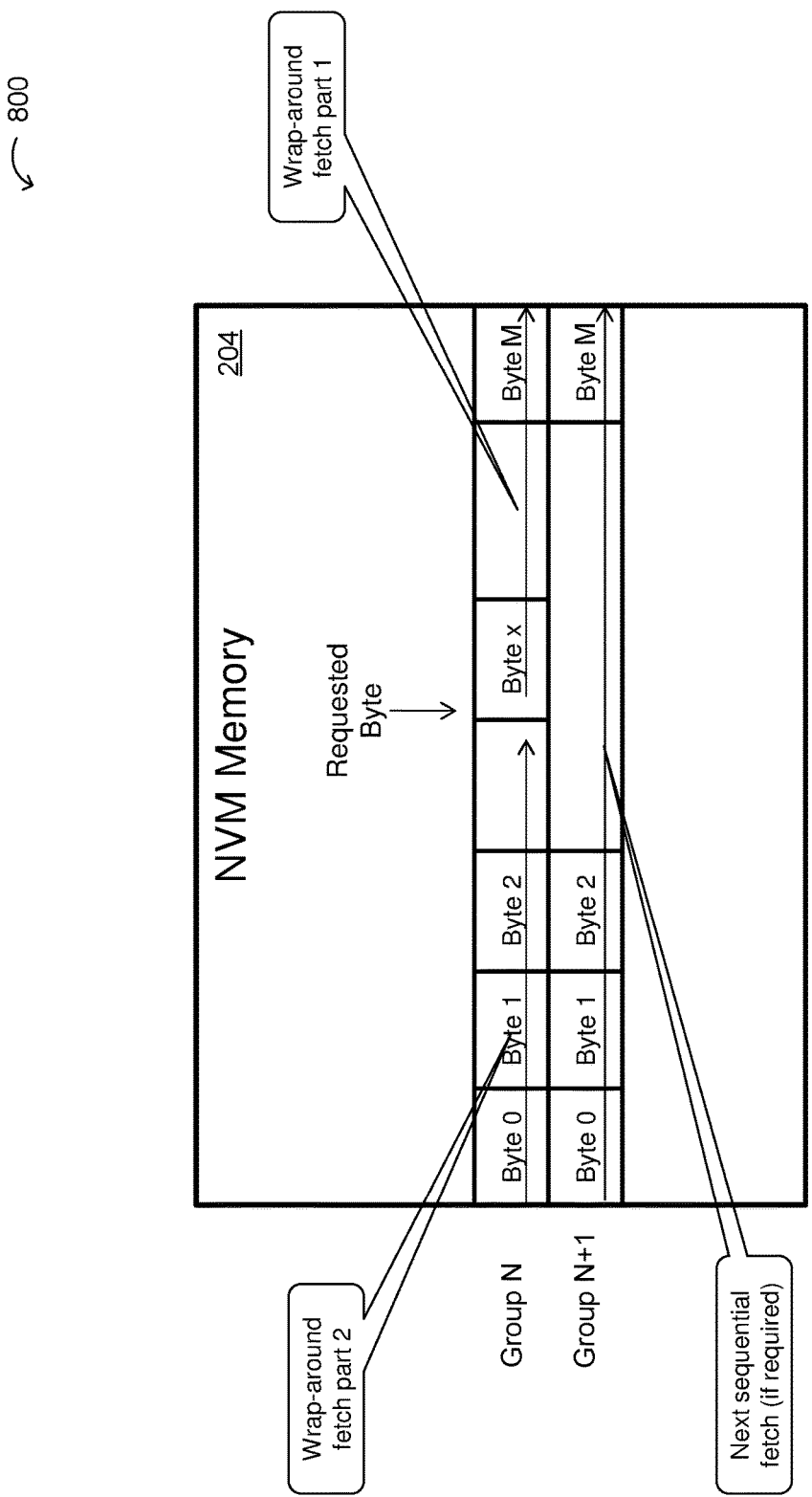
FIG. 8 is a block diagram of example fetch control and ordering, in accordance with embodiments of the present invention.

Referring now to FIG. 8, shown is a block diagram 800 of example fetch control and ordering, in accordance with embodiments of the present invention. Certain embodiments can support various orderings of accesses of bytes in group of NVM memory 204, such as for an implied sequential fetch command In response to an explicit read command, a critical byte (e.g., byte X) can be requested. In subsequent sequential fetch operations, a wrap-around fetch can occur first via part 1, followed by part 2, in order to complete the full read of group N. The next sequential fetch can occur to sequential group N+1, starting with byte 0, then byte 1, and so on through byte M. In this way, the next group allocated to the next cache line can be conditionally fetched with no need for a new command, address, mode, and/or dummy bytes.

In particular embodiments, both wrap-around (e.g., within a group of the critical byte), as well as the continuous mode that reads a next group from the memory array, can be supported. Various commands for the initial non-sequential read command for the critical byte can be utilized in order to request that the NVM device operate in a given mode. For example, in QPI mode and octal modes, the "burst read with wrap" command may be used to perform the read operation with a "wrap-around" feature. MCUs with cache may benefit from this feature as an efficient way of filling a full cache line in one burst, regardless of which byte in the cache line the read starts from. This can improve code execution performance in the MCU system because the MCU can initially receive the required data at that instant, followed by the remainder of the cache line, without sending additional commands or addresses to the NVM device.

The continuous mode of operation may further improve the MCU/host performance. This mode may allow the MCU to directly load the following cache line if desired, again without requiring additional commands or addresses being sent to the NVM device. For example, this can improve the performance of a typical MCU system by 40% or more without increasing the system clock speed. The behavior of the "burst read with wrap" command may be controlled by designated bits (e.g., W7-W5 bits) in a read parameters register (e.g., in control and protection logic 604) on the NVM device. For example, the wrap length may be set by bits W6-W5 in either mode, and can remain valid in any other mode, or be re-configured, such as by a set read parameters command.

The first group can be read in a wrap-around fashion (e.g., from byte X to byte M, and then wrapping around from byte 0 to byte X−1), followed by continuous reads in sequential order. In this way, first and second commands in some approaches can effectively be fused into one command in certain embodiments, whereby the second command is a continuous read command that starts at the next group. Also, such command "fusing" can essentially be bypassed, e.g., by de-asserting the chip select signal. Also, the second command may have implied parameters (address, mode, dummy bytes, etc.) and/or the second command may be a fully implied command.

Many processors will fetch a cache line, process that cache line, and then request the next cache line, such as by again toggling the clock. The delay for the processor/host to determine if the next cache line is actually desired can be as low as simply the next clock pulse with no clock suspension, or the delay may be arbitrarily long in a suspended clock situation. A "clock pulse" as described herein can be a full clock pulse, a half clock pulse, or merely a transition edge of a clock signal. Also as shown, particular embodiments support a wrap-around reading of the bytes within a given group that is allocated to a cache line (e.g., N), and then forward progression to the next group that is allocated to the next cache line (e.g., beginning at byte 0 of cache line N+1). Further, particular embodiments are suitable to various memory devices and interfaces, such as NVM devices and SPI interfaces.

Figure 9:
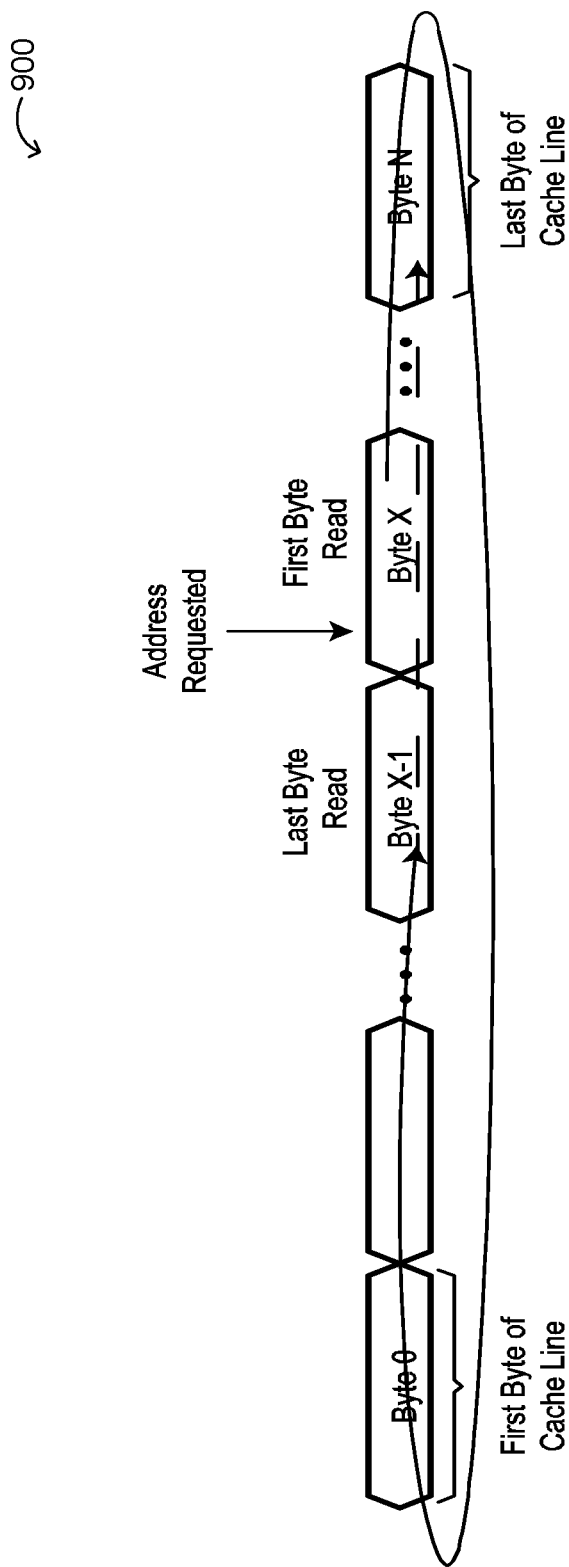
FIG. 9 is a waveform diagram of a first example burst read with wrap in a wrap-around mode, in accordance with embodiments of the present invention.

Referring now to FIG. 9, shown is a waveform diagram 900 of a first example burst read with wrap in a wrap-around mode, in accordance with embodiments of the present invention. For example, if bit W7 of the read parameters register is cleared, the NVM device may operate in a continuous mode. The "burst read with wrap" command may read to the end of a fixed length section (e.g., a group), then wrap-around to the beginning of the section and continue reading the same cache line for as long as additional clock pulses are provided on SCK. There may be no additional delay caused by the wrap-around, and the first byte of the group can immediately follow after the last byte, as shown in FIG. 9. For example, this mode of operation may provide compatibility with other devices, and for MCUs that do not support the continuous mode.

Figure 10:
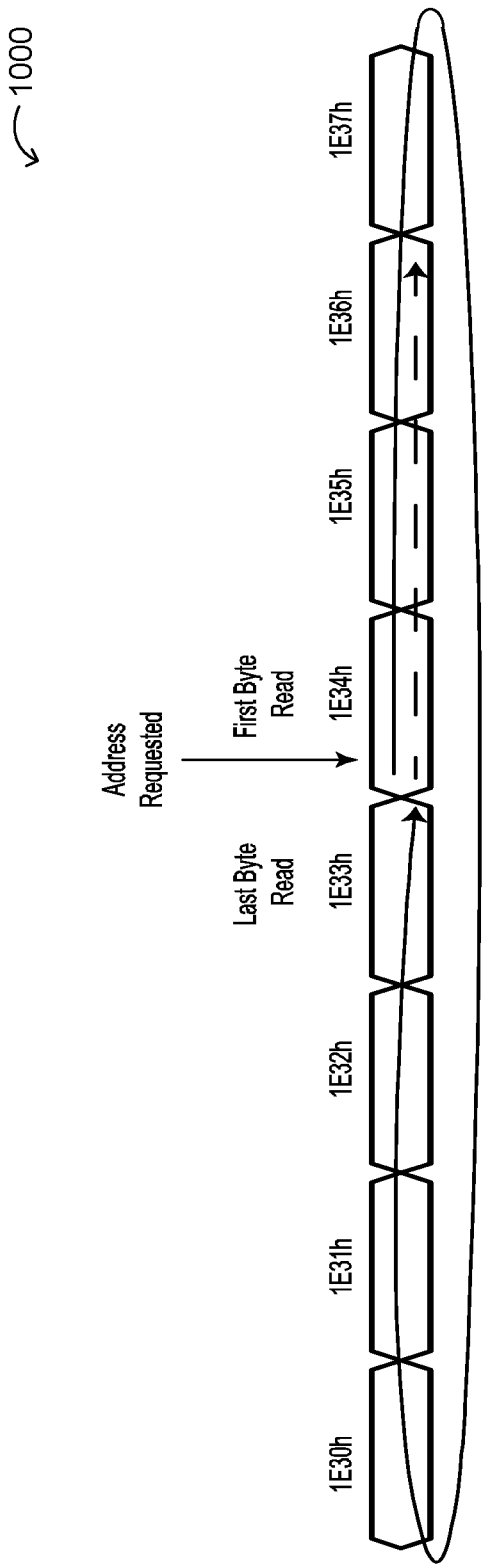
FIG. 10 is a waveform diagram of a first example burst read with wrap in a wrap-around mode, in accordance with embodiments of the present invention.

Referring now to FIG. 10, shown is a waveform diagram of a second example burst read with wrap in a wrap-around mode, in accordance with embodiments of the present invention. In example 1000, the wrap length is set to 8 (e.g., via the read parameters register), and the requested address is 1E34h for reading the critical byte. The NVM device can initially read address 1E34h, followed by 1E35h, 1E36h, and 1E37h. The read accesses may then wrap-around, and the next address to be read out may be 1E30h, followed by 1E31h, 1E32h, and then 1E3h. If the read operation continues, the device will then output data from address 1E34h, followed by data from address 1E35h, and so on. The NVM device may continuously read data in this fashion for as long as the device is clocked (e.g., via SCK toggling) and CS_ remains asserted (e.g., low).

Figure 11:
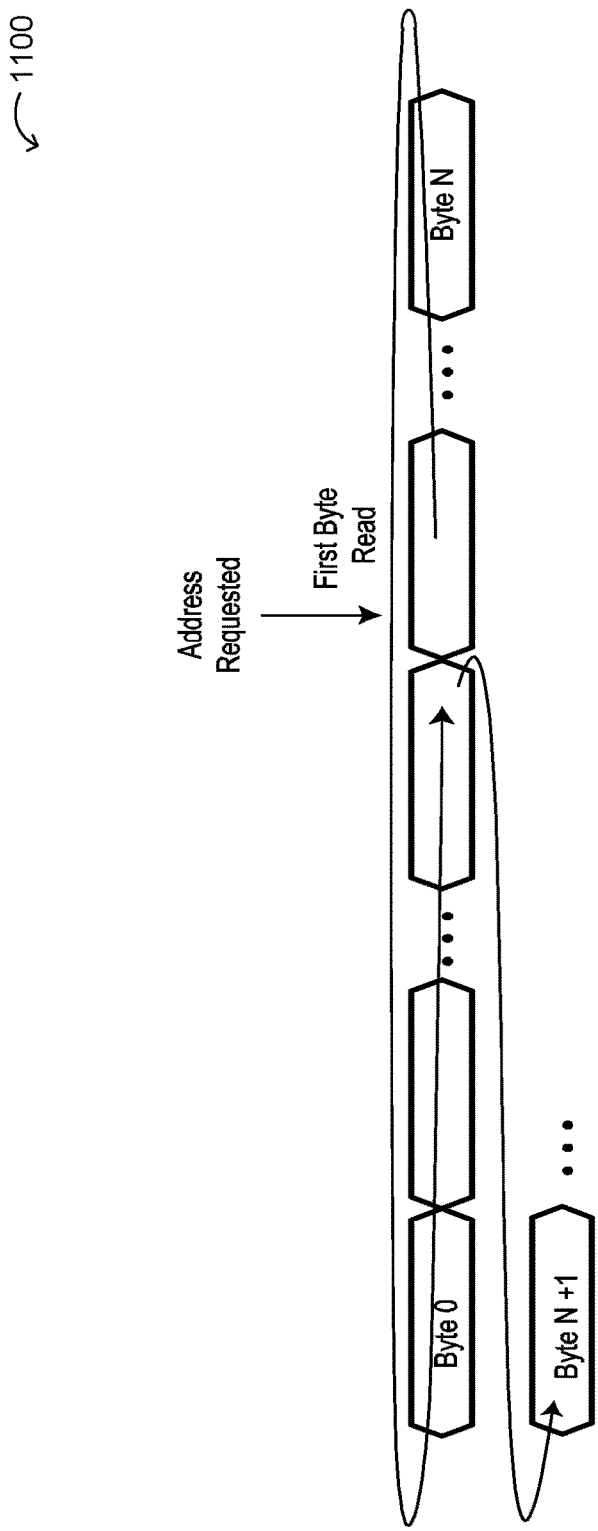
FIG. 11 is a waveform diagram of a second example burst read with wrap in a continuous mode, in accordance with embodiments of the present invention.

Referring now to FIG. 11, shown is a waveform diagram 1100 of a first example burst read with wrap in a continuous mode, in accordance with embodiments of the present invention. For example, if W7 is set (e.g., via the read parameters register), the NVM device may operate in the continuous mode. For the first cache line with the critical byte therein, the continuous mode can operate in the same, or substantially the same, way as the wrap-around mode discussed above. The "burst read with wrap" command can read to the end of the cache line, wrap-around to the beginning, and continue reading the same cache line until all bytes of the first cache line have been read out once.

In the next clock cycle, the NVM device (e.g., via control circuitry 304) can then start reading at the beginning of the next group, as shown in FIG. 11. The NVM device may continuously read for as long as SCK is clocked and chip select remains asserted. There may be no additional external delay caused by the wrap-around, and the first byte of the next group can immediately follow after the last byte of the current group. There also may be no additional delay caused by the jump to the next group, and the first byte of the following group can immediately follow after the last byte read from the previous group, independent of where in the cache line the jump occurs.

Figure 12:
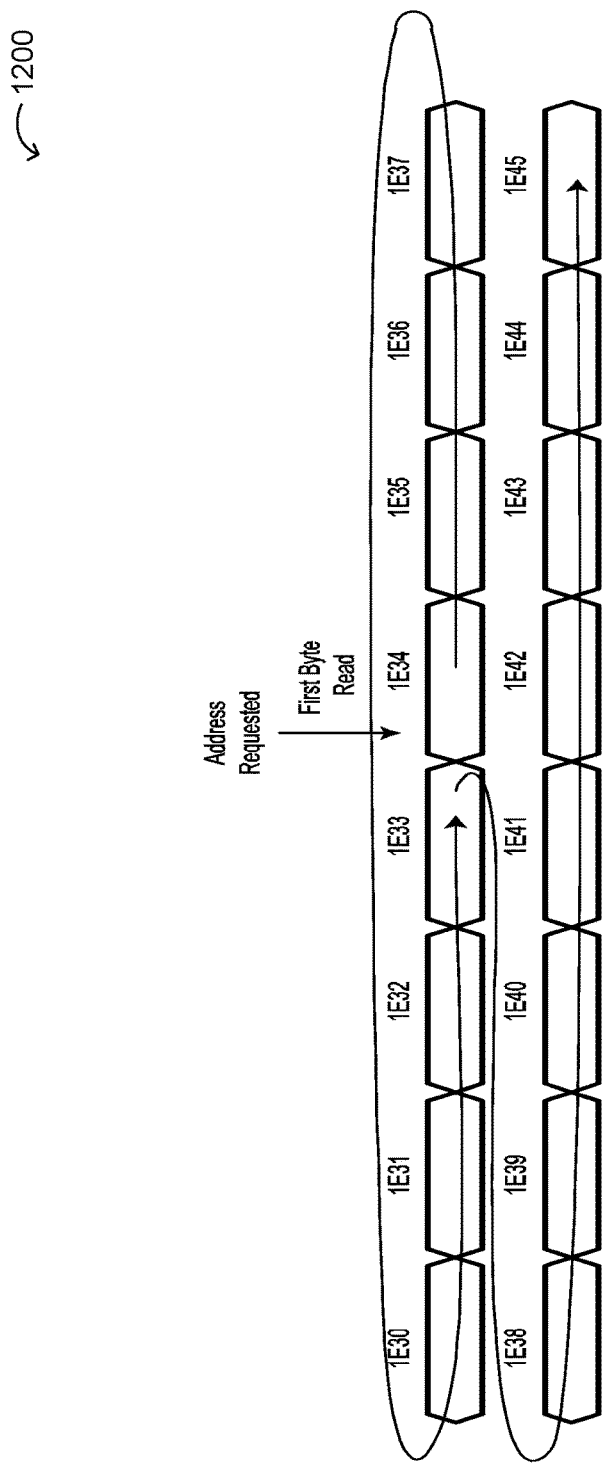
FIG. 12 is a waveform diagram of a second example burst read with wrap in a continuous mode, in accordance with embodiments of the present invention.

Referring now to FIG. 12, shown is a waveform diagram of a second example burst read with wrap in a continuous mode, in accordance with embodiments of the present invention. In example 1200, the wrap length may be set (e.g., via the read parameters register) to 8, and the requested address (e.g., for the critical byte) is 1E34h. The NVM device can initially read the data at 1E34h to access the critical byte, followed by 1E35h, 1E36h, and then 1E37h. The accesses may then wrap-around, and the next address to be accessed for read out may be 1E30h, followed by 1E31h, 1E32h, and then 1E3h. If the read operation continues, the NVM device may then output data from address 1E38h (the first byte of the next cache line), followed by data from address 1E39h, and so on. The NVM device may continuously read data out in this fashion for as long as the device is clocked by way of SCK toggling and CS_ remains asserted.

In one embodiment, a method of controlling memory device can include: (i) receiving from a host via an interface, a first read command for a critical byte, where the critical byte resides in a first group of a memory array on the memory device; (ii) reading the critical byte from the memory array in response to the first read command, and providing the critical byte to the host; (iii) reading a next byte in the first group; (iv) outputting the next byte from the first group when a clock pulse is received on the interface; (v) repeating the reading the next byte and the outputting the next byte for each byte in the first group; (vi) reading a first byte in a second group of the memory array, where the second group is sequential to the first group, and where each group is allocated to a cache line; and (vii) outputting the first byte from the second group when a clock pulse is received on the interface.

Figure 13:
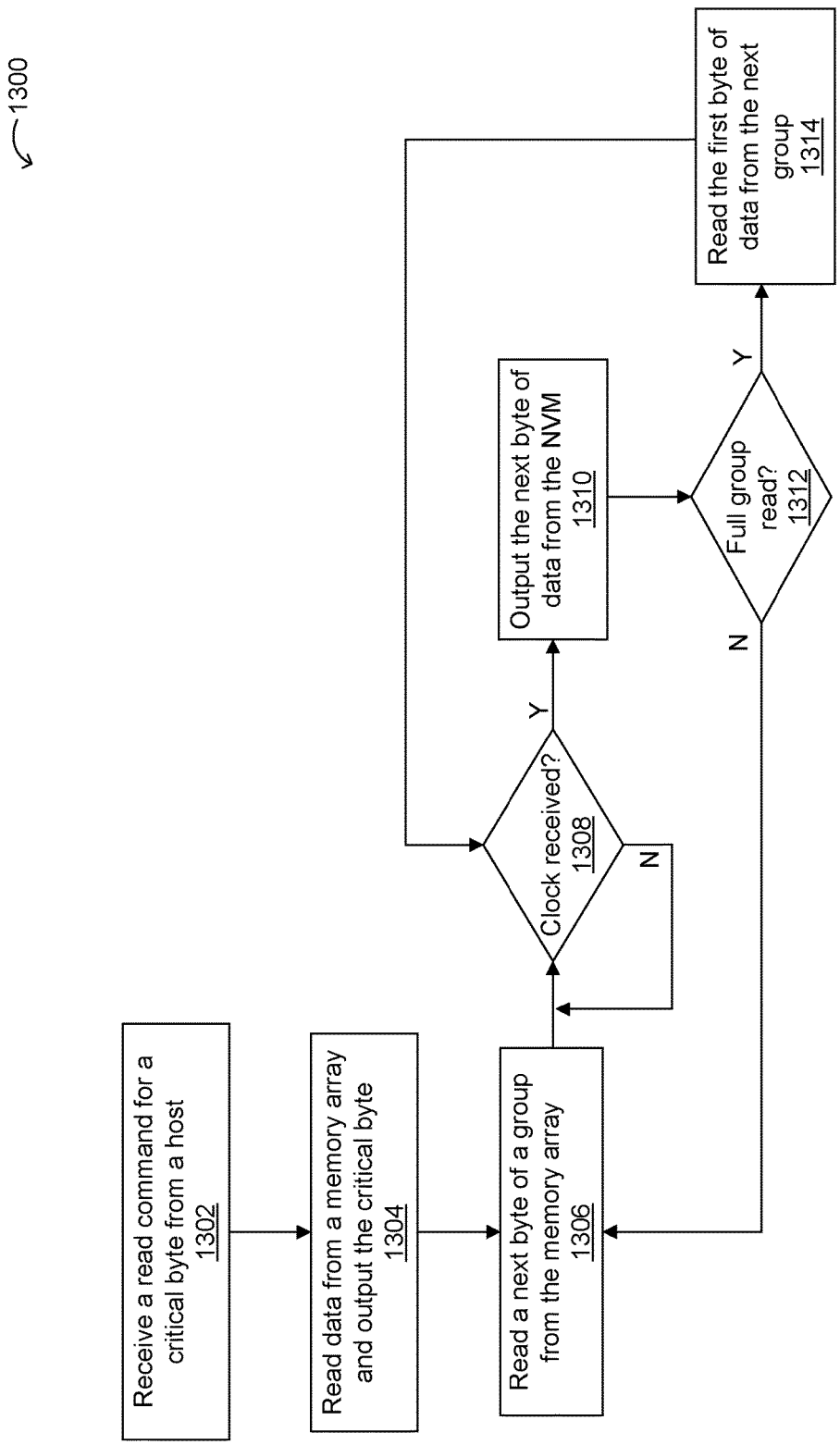
FIG. 13 is a flow diagram of an example method of controlling an NVM device, in accordance with embodiments of the present invention.

Referring now to FIG. 13, shown is a flow diagram of an example method 1300 of controlling an NVM device, in accordance with embodiments of the present invention. At 1302, a read command for a critical byte can be received from a host via an interface (e.g., 302). The critical byte may reside in a group of a memory array (e.g., 316) on the NVM device, and the group may be allocated to a cache line of host 202. At 1304, the critical byte from the memory array can be read and output (e.g., via I/O buffers 306) in response to the read command. At 1306, a next byte in the group can be read from the memory array. If a clock pulse (e.g., SCK toggling) is received at 1308, the next byte from the group can be output from the NVM device at 1310. Steps 1306, 1308, and 1310 can be repeated until a full group corresponding to a cache line has been read at 1312. For example, this full group read can include a wrap-around to the byte having an address that is aligned with the group address. At 1314, a first byte in a next group of the memory array can be read, and output can be provided at 1310 in response to a clock pulse received at 1308. The next group may be sequential to the group containing the critical byte of data, and this next group may be allocated to a next cache line of host 202.

In particular embodiments, the system can be optimized for the common occurrence of sequential fetch, while being ready to perform another type of a transaction if the CPU/host actually does not need be sequential fetch operation to be executed. As shown above, continuous read operations can be utilized, with host being able to abort this operation by de-asserting the chip select pin, such as when the CPU needs to perform a transaction other than an implied sequential fetch.

The SPI timing and associated diagrams as shown herein merely serve as examples, but particular embodiments are also suited for SPI protocol supporting other modes of operation and/or types of operations. Specifically, some examples above may utilize 4-4-4 command mode (4 pins for opcode, 4 for address, and 4 for data) in single data rate, but particular embodiments are also suitable for other command modes. Example command modes are specified in the JEDEC Serial Flash Discoverable Parameters (SFDP) specification JESD216B (Revision of JESD216A, July 2013), which is available from the JEDEC website.

While the above examples include circuit, operational, and various structural implementations of certain memory cells and programmable impedance devices, one skilled in the art will recognize that other technologies and/or cell structures can be used in accordance with embodiments. Also, while NVM devices and SPI interfaces are primarily described via examples herein, particular embodiments are also applicable to other types of memory devices and/or interfaces. Further, one skilled in the art will recognize that other device circuit arrangements, architectures, elements, and the like, may also be used in accordance with embodiments. Further, the resistance levels, operating conditions, and the like, may be dependent on the retention, endurance, switching speed, and variation requirements of a programmable impedance element, in a CBRAM example.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of controlling a memory device, the method comprising:
   a) receiving from a host via an interface, a first read command for a critical byte, wherein the critical byte resides in a first group of a memory array on the memory device, and the interface is between the memory device and the host;
   b) reading the critical byte from the memory array in response to the first read command, and providing the critical byte to the host;
   c) reading a next byte in the first group;
   d) outputting the next byte from the first group when a clock pulse is received on the interface;
   e) repeating the reading the next byte and the outputting the next byte for each byte in the first group;
   f) reading a first byte in a second group of the memory array, wherein the second group is sequential to the first group, and wherein each group is allocated to a cache line; and
   g) outputting the first byte from the second group when a clock pulse from the host is received on the interface.

2. The method of claim 1, further comprising:
   a) reading a next byte in the second group;
   b) outputting the next byte from the second group when a clock pulse is received on the interface; and
   c) repeating the reading the next byte and the outputting the next byte for each byte in the second group.

3. The method of claim 2, further comprising:
   a) reading a first byte in a third group, wherein the third group is sequential to the second group;
   b) outputting the first byte from the third group when a clock pulse is received on the interface;
   c) reading a next byte in the third group;
   d) outputting the next byte from the third group when a clock pulse is received on the interface; and
   e) repeating the reading the next byte and the outputting the next byte for each byte in the third group.

4. The method of claim 1, wherein the first read command comprises opcode, address, mode, and dummy bytes on the interface.

5. The method of claim 4, further comprising receiving, by the interface, a second read command from the host, wherein the second read command excludes address, mode, and dummy bytes on the interface.

6. The method of claim 5, wherein:
   a) an address of the first read command points to any one byte within a group; and
   b) an implied address of the second read command points to a first byte within a group.

7. The method of claim 5, wherein the receiving the second read command further excludes opcode bytes on the interface.

8. The method of claim 1, further comprising interrupting the repeating in response to a chip select on the interface being de-asserted.

9. The method of claim 1, wherein:
   a) the repeating the reading the next byte and the outputting the next byte for each byte in the first group comprises a wrap-around to a byte address that is aligned with the first group; and b) the reading the first byte in the second group comprises accessing data from a byte address that is aligned with the second group.

10. The method of claim 1, wherein the memory array comprises a plurality of resistive memory cells, wherein each of the resistive memory cells is configured to be programmed to a low resistance state by application of a first voltage in a forward bias direction, and to be erased to a high resistance state by application of a second voltage in a reverse bias direction.

11. A memory device, comprising:
   a) an interface configured to receive a first read command for a critical byte from a host, wherein the interface is between the memory device and the host;
   b) a memory array configured to store a plurality of bytes of data, wherein the critical byte resides in a first group of the memory array, and wherein execution of the first read command comprises reading the critical byte from the memory array, and providing the critical byte to the host;
   c) a controller configured to execute a read of a next byte in the first group;
   d) an output buffer configured to output the next byte from the first group when a clock pulse is received on the interface, wherein the controller and the output buffer are configured to repeat the read and the output of the next byte for each byte in the first group;
   e) the controller being configured to read a first byte in a second group of the memory array, wherein the second group is sequential to the first group; and
   f) the output buffer being configured to output the first byte from the second group when a clock pulse from the host is received on the interface.

12. The memory device of claim 11, wherein:
   a) the controller is configured to read a next byte in the second group; and
   b) the output buffer is configured to output the next byte from the second group when a clock pulse is received on the interface, wherein the controller and the output buffer are configured to repeat the read and the output of the next byte for each byte in the second group.

13. The memory device of claim 12, wherein:
   a) the controller is configured to read a first byte in a third group, wherein the third group is sequential to the second group;
   b) the output buffer is configured to output the first byte from the third group when a clock pulse is received on the interface;
   c) the controller is configured to read a next byte in the third group; and
   d) the output buffer is configured to output the next byte from the third group when a clock pulse is received on the interface, wherein the controller and the output buffer are configured to repeat the read and the output of the next byte for each byte in the third group.

14. The memory device of claim 11, wherein the first read command comprises opcode, address, and dummy bytes on the interface.

15. The memory device of claim 14, wherein the interface is configured to receive a second read command from the host, wherein the second read command excludes address, mode, and dummy bytes on the interface.

16. The memory device of claim 15, wherein:
   a) an address of the first read command points to any one byte within a group; and
   b) an implied address of the second read command points to a first byte within a group.

17. The memory device of claim 15, wherein the second read command further excludes opcode bytes on the interface.

18. The memory device of claim 11, wherein the controller is configured to interrupt repetition of the read and the output in response to a chip select on the interface being de-asserted.

19. The memory device of claim 11, wherein the memory array comprises a plurality of resistive memory cells, wherein each of the resistive memory cells is configured to be programmed to a low resistance state by application of a first voltage in a forward bias direction, and to be erased to a high resistance state by application of a second voltage in a reverse bias direction.

20. The memory device of claim 11, wherein:
   a) the controller and the output buffer being configured to repeat the read and the output of the next byte for each byte in the first group comprises a read of a byte address that is aligned with the first group; and
   b) the controller being configured to read the first byte in the second group comprises accessing data from a byte address that is aligned with the second group.

21. A method of controlling a memory device by a host, the method comprising:
   a) sending from the host to the memory device via an interface, a first read command for a critical byte, wherein the critical byte resides in a first group of a memory array on the memory device, and the interface is between the memory device and the host;
   b) receiving the critical byte from the memory device, wherein the memory device accesses the critical byte from the memory array in response to the first read command;
   c) receiving a next byte from the first group in response to sending a clock pulse on the interface, wherein the memory device automatically accesses the next byte;
   d) repeating the receiving the next byte for each byte in the first group; and
   e) receiving a first byte in a second group of the memory array in response to sending a clock pulse from the host on the interface, wherein the second group is sequential to the first group, and wherein each group is allocated to a cache line.

22. The method of claim 21, further comprising:
   a) receiving a next byte in the second group in response to sending a clock pulse on the interface, wherein the memory device automatically accesses the next byte from the second group; and
   b) repeating the receiving the next byte for each byte in the second group.

23. The method of claim 22, further comprising:
   a) receiving a first byte in a third group in response to sending a clock pulse on the interface, wherein the third group is sequential to the second group;
   b) receiving a next byte in the third group in response to sending a clock pulse on the interface; and
   c) repeating the receiving the next byte for each byte in the third group.

24. The method of claim 21, wherein the first read command comprises opcode, address, mode, and dummy bytes on the interface.

25. The method of claim 24, further comprising sending, by the interface, a second read command to the memory device, wherein the second read command excludes address, mode, and dummy bytes on the interface.

26. The method of claim 25, wherein:
a) an address of the first read command points to any one byte within a group; and
b) an implied address of the second read command points to a first byte within a group.

27. The method of claim 25, wherein the sending the second read command further excludes opcode bytes on the interface.

28. The method of claim 21, further comprising de-asserting a chip select on the interface to interrupt the repeating.

29. The method of claim 21, wherein:
a) the repeating the receiving the next byte for each byte in the first group comprises a wrap-around to a byte address that is aligned with the first group; and
b) the receiving the first byte in the second group comprises accessing data from a byte address that is aligned with the second group.

30. The method of claim 29, further comprising fusing two read commands into the first read command for a continuous and sequential read operation on the memory device.

31. A memory system, comprising:
a) a host coupled to a memory device via an interface, wherein the interface is between the memory device and the host;
b) the memory device being configured to receive a first read command for a critical byte from the host via the interface;
c) the memory device comprising a memory array configured to store a plurality of bytes of data, wherein the critical byte resides in a first group of the memory array, and wherein execution of the first read command comprises reading the critical byte from the memory array, and providing the critical byte to the host;
d) the memory device comprising a controller configured to execute a read of a next byte in the first group;
e) the memory device comprising an output buffer configured to output the next byte from the first group when a clock pulse from the host is received on the interface, wherein the controller and the output buffer are configured to repeat the read and the output of the next byte for each byte in the first group;
f) the controller on the memory device being configured to read a first byte in a second group of the memory array, wherein the second group is sequential to the first group; and
g) the output buffer on the memory device being configured to provide the first byte from the second group to the host when a clock pulse from the host is received on the interface.

32. The memory system of claim 31, wherein:
a) the controller on the memory device is configured to read a next byte in the second group; and
b) the output buffer on the memory device is configured to provide the next byte from the second group to the host when a clock pulse from the host is received on the interface, wherein the controller and the output buffer are configured to repeat the read and the output of the next byte for each byte in the second group.

33. The memory system of claim 32, wherein:
a) the controller on the memory device is configured to read a first byte in a third group, wherein the third group is sequential to the second group;
b) the output buffer on the memory device is configured to provide the first byte from the third group to the host when a clock pulse from the host is received on the interface;
c) the controller on the memory device is configured to read a next byte in the third group; and
d) the output buffer on the memory device is configured to provide the next byte from the third group to the host when a clock pulse from the host is received on the interface, wherein the controller and the output buffer are configured to repeat the read and the output of the next byte for each byte in the third group.

34. The memory system of claim 31, wherein the first read command comprises opcode, address, and dummy bytes on the interface.

35. The memory system of claim 34, wherein the memory device is configured to receive a second read command from the host via the interface, wherein the second read command excludes address, mode, and dummy bytes on the interface.

36. The memory system of claim 35, wherein:
a) an address of the first read command points to any one byte within a group; and
b) an implied address of the second read command points to a first byte within a group.

37. The memory system of claim 35, wherein the second read command further excludes opcode bytes on the interface.

38. The memory system of claim 31, wherein:
a) the host is configured to de-assert a chip select on the interface; and
b) the controller on the memory device is configured to interrupt repetition of the read and the output in response to the chip select being de-asserted.

39. The memory system of claim 31, wherein the host is configured to fuse two read commands into the first read command for a continuous and sequential read operation on the memory device.

40. The memory system of claim 31, wherein:
a) the controller and the output buffer on the memory device being configured to repeat the read and the providing of the next byte for each byte in the first group comprises a read of a byte address that is aligned with the first group; and
b) the controller on the memory device being configured to read the first byte in the second group comprises accessing data from a byte address that is aligned with the second group.

* * * * *